Aug. 19, 1924.

J. T. McNALLY 1,505,720

FREIGHT CAR

Filed Dec. 30, 1922

Witnesses:

Inventor:
James T. McNally
By Joshua R. H. Booth
His Attorney

Aug. 19, 1924.
J. T. McNALLY
1,505,720
FREIGHT CAR
Filed Dec. 30, 1922
2 Sheets-Sheet 2
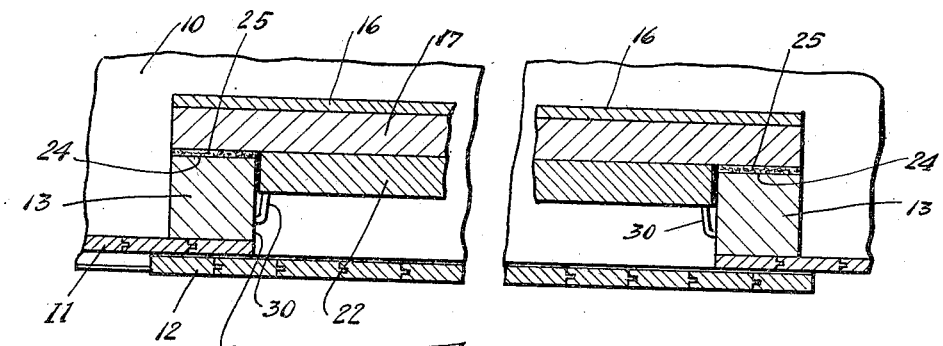
Fig. 3
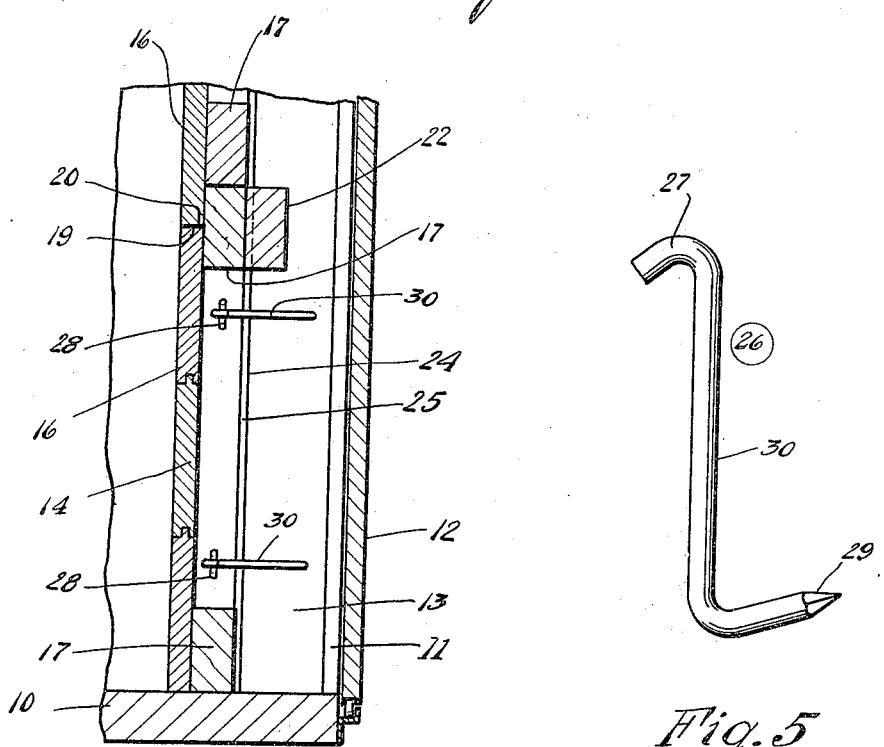
Fig. 4
Fig. 5
Witnesses:
Inventor:
James T. McNally
By Joshua R. H. Potts
His Attorney Patented Aug. 19, 1924.

1,505,720

UNITED STATES PATENT OFFICE.

JAMES T. McNALLY, OF CHICAGO, ILLINOIS.

FREIGHT CAR.

Application filed December 30, 1922. Serial No. 609,898.

*To all whom it may concern:*

Be it known that I, JAMES T. McNALLY, a citizen of the United States, and a resident of the city of Chicago, county of Cook, and State of Illinois, have invented certain new and useful Improvements in Freight Cars, of which the following is a specification.

My invention relates to improvements in freight cars of the type designed for transporting grain such as oats, flaxseed or other like natural products, and has for its principal object the provision of an improved construction of this character which will be highly efficient in use.

Among the objects of the invention is the provision of a closure member for the door opening of a freight car which will prevent the loss of grain in the car through small crevices or the like.

Other objects will appear hereinafter.

The invention consists in the combinations and arrangements of parts hereinafter described and claimed.

The invention will be best understood by reference to the accompanying drawings forming a part of this specification, and in which, Fig. 1, is a fragmentary side elevational view of a freight car showing the doors of the car open, showing my improved closure member mounted in position;

Fig. 3, is a sectional view of the invention taken substantially on line 3—3 of Fig. 1;

Fig. 4, is a sectional view of the invention taken substantially on line 4—4 of Fig. 1; and Fig. 5, is an elevational view of one of the fastening members embodied in the invention.

Figure 1:
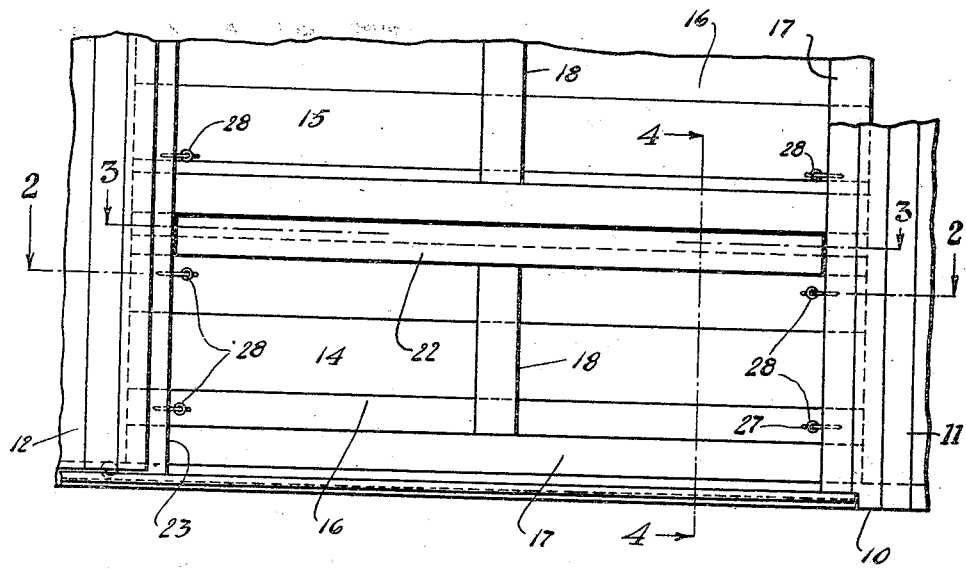

Referring to the drawings showing the preferred form of construction 10 indicates a freight car, 11 the door opening of the same, 12 the slidable door of the door opening 11, and 13 the door jambs. The construction so far illustrated is analogous to the structure of most ordinary freight cars adapted for the purpose of transporting grain or the like.

The closure member embodying the invention, is built up of sectional parts 14 and 15, arranged as best illustrated in Fig. 1. The construction of the sectional parts 14 and 15 are analogous and the construction of one applies to the construction of the other and in this instance, each of the parts 14 and 15 are rectangular in shape and built up of wooden members 16 reenforced along their marginal edges by horizontally and vertically extending members 17 and centrally reenforced transversely by a member 18. The top horizontal reenforcing member 17 of each of the sectional parts, projects an appreciable distance above the top edge indicated at 19 so as to form a recess 20 for the reception of the adjacent edge of the sectional part thereabove when arranged as illustrated.

On the outer face of the upper horizontal reenforcing member 17 of each of the sectional parts 14 and 15 extends a brace 22 the extremities of which are adapted to abut against the adjacent faces 23 of the door jambs 13 and brace the door frame against undue strain when the freight car is in motion.

Figure 2:
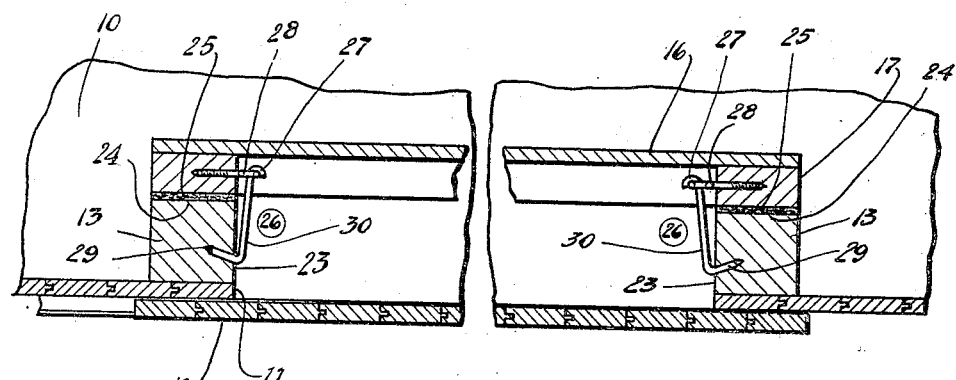
Fig. 2, is a sectional view of the invention taken substantially on line 2—2 of Fig. 1.

The inner faces of the door jambs 13 as indicated at 24 I cover with strips of felt 25 against which the vertical marginal reenforcing members 17 are forced into engagement by the fastening members 26. The fastening members 26 are each formed of such material that will best serve the purpose and have their extremities bent in opposite directions, one being indicated at 27 and shown as being bent in hook form and is adapted to be hooked into engagement with an eyelet 28 screw threaded in one of the vertical reenforcing members 17 and projecting laterally from the side edge thereof in a plane parallel with the adjacent side of the closure member as best shown in Fig. 2.

The opposite end of the fastening member 26 has a nail point formed on its end as indicated at 29 and is bent so as to form an acute angle with respect to the body, indicated at 30, of the fastening member. By forming this end of the fastening member in the manner as herein stated when the end is driven into one of the door jambs 13 the angular formation of the bent end causes the sectional part to which the fastening member is hooked to be drawn toward the face of the adjacent door jamb against the strip of felt thereon, thereby sealing the joint between the reenforcing member 17 and the adjacent door jamb.

By the construction as herein set forth it is apparent that the closure member is sealed tight, leaving no crevices through which the grain such as flaxseed, oats or other like natural products can pass, thereby saving large quantities of grain which would otherwise be lost. It is also apparent that by the construction herein set forth I provide a closure member for the purposes herein mentioned that can be economically manufactured and which will be highly efficient in use.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A structure of the class described including a closure member having its side edge portions abutting the inner faces of the jambs of a door opening, eyelets carried by the closure member and extending in a plane parallel with the adjacent side thereof, and fastening members having open hook shaped end portions for hooked engagement with the eyelets and provided with acute angled extended portions adapted to be driven into the jambs of the door opening.

2. A structure of the class described including a closure member comprising sections arranged edge to edge and having side edge portions abutting the inner faces of the jambs of a door opening, eyelets carried by the closure member and extending in a plane parallel with the adjacent sides thereof, and fastening members for detachable hooked engagement with the eyelets and having acute angled extended portions adapted to be driven into the jambs of the door opening.

3. A structure of the class described including a closure member having sections arranged edge to edge, eyelets having portions screw threaded in the closure member and extending in a plane parallel with the adjacent sides thereof, and fastening members for detachable hooked engagement with the eyelets and having acute angled portions adapted to be driven into the jambs of the door opening.

4. A structure of the class described including in combination with a door opening and the door jambs thereof, of a closure member for the opening built up of sectional parts with each section having re-enforcing members extending along the side and top edges thereof, the re-enforcing member of each section extending along the top edge being mounted with a portion extending an appreciable distance above the top edge of the section providing a recess adapted to accommodate the lower edge portion of the section thereabove and the side re-enforcing members being adapted for abutment with the adjacent faces of the door jambs, a member fixed to the top re-enforcing member adapted to abut the opposite sides of the door jamb, and fastening members for said sections, said fastening members including eyelets having threaded engagement with the side re-enforcing members and hook portions detachably fixed to the eyelets and having end portions adapted to be driven into the adjacent side faces of the door jambs.

5. A structure of the class described including a closure member, eyelets carried by the closure member and extending in a plane parallel with the adjacent side thereof, and fastening members having bent end portions for detachable hooked engagement with the eyelets and having acute angled portions bent in opposite directions to the other end portions of the fastening members and adapted to be driven into the jambs of a door opening.

In testimony whereof I have signed my name to this specification in the presence of two subscribing witnesses.

JAMES T. McNALLY.

Witnesses:
MARGARET AUER,
JOSHUA R. H. POTTS.